Nov. 5, 1929.  E. F. WHITE  1,734,066
METHOD OF TREATING SULPHUR
Filed April 7, 1926
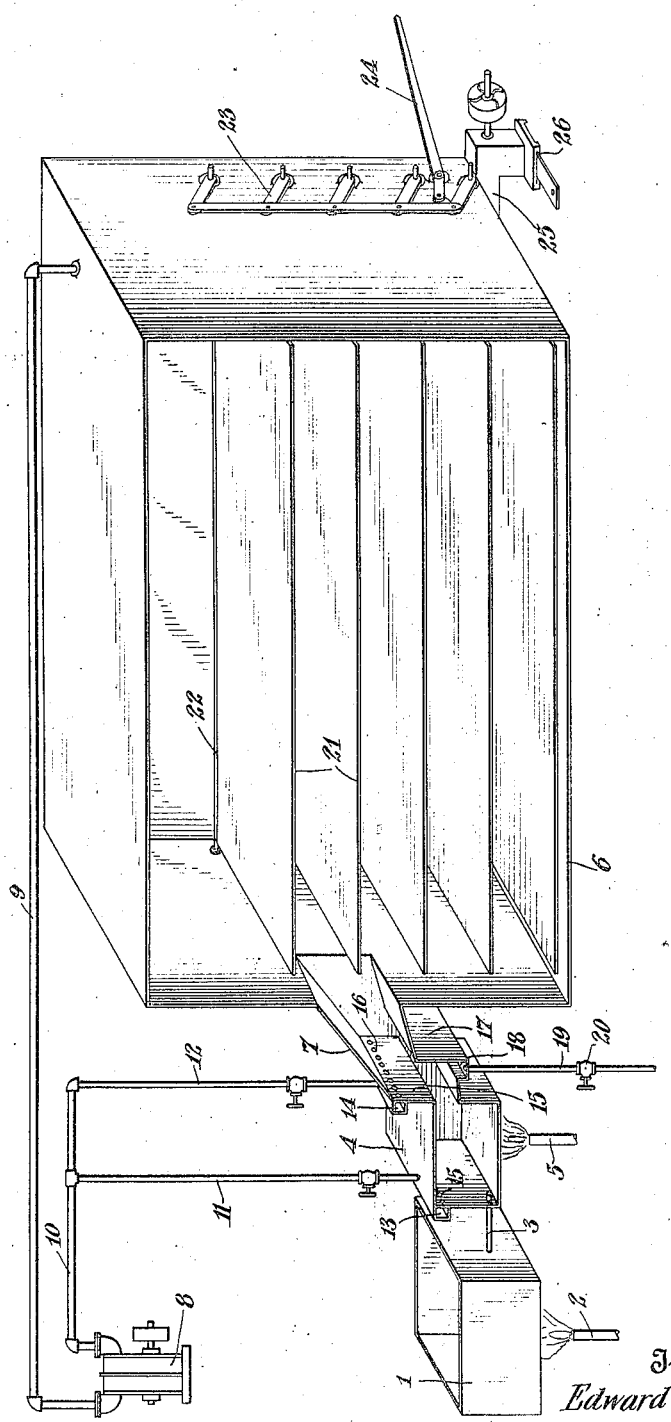
Inventor
Edward F. White
By his Attorney Daniel L. Morris Patented Nov. 5, 1929

1,734,066

UNITED STATES PATENT OFFICE

EDWARD F. WHITE, OF ROCHESTER, NEW YORK

METHOD OF TREATING SULPHUR

Application filed April 7, 1926. Serial No. 100,275.

In the ordinary and hitherto employed process of refining substances by sublimation the crude substance is vaporized and the vapours evolved are conveyed to a cooling chamber in which they are condensed directly to the solid state, the resulting product appearing on the walls of the cooling chamber in the form of a light powdery deposit. When sulphur is so treated, the sublimate, known as flowers of sulphur, is found to contain, intermixed among the fine dry crystalline flowers, a certain amount of sulphur in the form of an amorphous powder which contaminates and renders impure the sulphur flowers and detracts very materially from their commercial value.

The object of my invention is to devise a method for refining substances by condensation and sublimation by which a substantially pure product can be obtained and which in the case of sulphur results in a sublimate consisting of flowers of sulphur free from the undesirable amorphous sulphur referred to.

It is a well known fact that many substances occur in different allotropic forms which exhibit different characteristics and properties. No other element, perhaps, is known to occur in as many allotropic forms as sulphur. In the gaseous state, at least four molecular modifications have been studied and are known, namely S, $S_2$, $S_6$, and $S_8$. As the lower temperatures, the molecules of higher valence predominate while at the higher temperatures the molecules of higher valence break down and the molecules of lower valence form the bulk of the sulphur vapour. At temperatures of between 700–800° F. at which the refining process is ordinarily carried out, the sulphur vapours contain a mixture of molecules in approximately the proportions 4% $S_2$, 54% $S_6$, and 42% $S_8$. Now my experiments have shown that if the $S_2$ and $S_8$ molecules are suddenly chilled below the freezing temperature they condense directly into dry, fine crystals of flowers of sulphur which are substantially free from any impurities. On the other hand the $S_6$ molecules condense under the same conditions to an amorphous, rubber-like mass. The above phenomena have led me to believe that the amphorous impurities in the flowers of sulphur produced by the ordinary and hitherto employed processes of refining sulphur by sublimation are due to the presence in the sulphur vapour of the molecules, $S_6$.

The improved process consists in one aspect in treating the sulphur vapours before conveying them to the cooling chamber in order to break down, remove and extract the objectionable $S_6$ molecules. My experiments have shown that if the sulphur vapours are subjected to mechanical bombardment and shock, such as results when they are projected against a wall or baffle plate at a considerable velocity, the $S_6$ molecules will break down and precipitate out in a liquid form which changes on cooling into amorphous, rubber-like mass and the remaining vapours will consist solely of the lighter $S_2$ and broken up (by diffusion) $S_8$ molecules. In my process I make use of the above discovery to extract the $S_6$ molecules from the vapours to be sublimated, that is, I subject said vapours to mechanical shock or impact to remove or break down the $S_6$ molecules therefrom before conveying the vapours into the cooling chamber.

In carrying out the process, liquid sulphur is preferably allowed to continuously flow into a vaporizing vessel by gravity so that the continuous inflow of liquid sulphur is proportionate to the rate of evaporation from the liquid in the vessel. The generated vapor is immediately diffused in a current of inert gas injected across the vaporizing surface by a primary gas injection and a baffle is interposed in the path of the resulting mixture, thereby subjecting the mixture to a mechanical shock causing the precipitation of the heavier or $S_6$ particles of sulphur which are removed without interrupting the process. The lighter particles of sulphur with the inert gas in which they are diffused are conveyed thru a passage where they are preferably subjected to a second inert gas injection which serves to disperse and diffuse the light sulphur particles thru a cooling chamber. The dispersed particles are sublimated in said chamber and arrested at different times and at different levels therein preferably by a plurality of planes which are interposed in the path of the mixture in the chamber. The flowers of sulphur are consequently deposited on the planes in the chamber in varying grades of fineness, depending upon the time taken to arrest the particles. These sulphur flowers are removed from the cooling chamber without interrupting the process, preferably by tilting the planes, collecting the flowers at the bottom of the chamber and withdrawing the collected sulphur. The inert gas is returned for further use in the gas injections and during the process there is a continuous circulation of inert gas thru the system.

This application is in part a division and in part a continuation of my prior application, Serial No. 749,674, filed November 13, 1924.

My invention will be more clearly understood from the following description of the accompanying drawing in which I have shown an apparatus for carrying out the process. I desire that it be distinctly understood, however, that I do not intend to be limited to the specific details disclosed as it is obvious that the general principles of my invention are capable of wide application.

In the drawing, the single figure shows more or less diagrammatically an apparatus that may be used in carrying out the process and method.

The numeral 1 indicates a receptacle in which the crude sulphur is placed. The fire 2 melts the sulphur and the liquid flows by gravity through the pipe 3 into the container or vaporizing vessel 4 where it is converted into vapour by means of a suitable heating means 5. By allowing the sulphur to flow freely into the container 4, the continuous flow thereof is regulated by the rate of evaporization from the container. The container is connected to the cooling or sublimating chamber 6 by means of the passage 7 which flares upwardly and at an acute angle.

Inasmuch as the burning temperature of sulphur is below its boiling point, it is necessary to maintain for vaporization an atmosphere of inert gas free of oxygen. For this reason and for other reasons which will hereinafter appear, I provide the constant pressure pump 8 which maintains and causes a circulation of an inert gas, such as $CO_2$, throughout the system. The pump draws the inert gas from the cooling chamber 6, through the pipe line 9 and discharges it through the pipe line 10 into the pipes 11, 12, and the gas chambers 13, 14. Valves are preferably inserted into the pipe lines 11, 12, to regulate the pressure of the gas. The gases in the chambers 13, 14 are emitted through the small openings 15 and 16, in jets of high velocity. The insert gas is passed over the vaporizing surface of the liquid and the vapors immediately diffused therein. The jets from the gas chamber 13 project the sulphur vapour against the baffle plate or wall 17 of the container with considerable force. This results in the breaking down, precipitation or condensation of the heavy and more or less stable $S_6$ allotropic form of the sulphur vapor and the liquid is collected in the trough 18. The liquid may be allowed to overflow the trough and flow back into the vaporizing vessel or it may be drawn off through the pipe 19 which is provided with a valve 20 to enable this operation to be performed, and cast in moulds as solid brimestone. The remainder of the sulphur vapours consisting essentially of only the $S_2$ and broken up $S_8$ forms rise into the passage 7 where they are diffused into the sublimating chamber by the gas jets emitting from the second gas chamber 14 and are there converted into flowers of sulphur.

In order to increase the rapidity and efficiency of sublimation, I provide in the chamber 6, the horizontal plates 21, each of which is rigidly and pivotally supported on shafts 22. These plates greatly increase the amount of depositing surface for the sulphur flowers and sublimation goes on at a more rapid rate than if the flowers had to settle to the floor. The plates also serve to cool the vapour more rapidly, by ventilating the precipitated flowers, and to keep the temperature of the chamber from rising, and they result in the production of flowers having the maximum degree of fineness and lightness. The sulphur particles are arrested on the planes at different times or at different levels so that the sulphur flowers deposited on the planes are of varying degrees of fineness depending upon the times before arresting. The shafts 22 may be simultaneously rotated by means of the system of links 23 and lever 24 and the plates 21 changed to vertical positions, resulting in the sulphur flowers falling into the trough 25 from which they are withdrawn through the valve 26 and thus removed without interrupting the process or the continuous circulation of the inert gas thru the system.

The sulphur flowers produced by the method described above are found to be composed purely of minute crystals and are free of the amorphous agglomrated masses which characterize the product made by the processes hitherto employed.

Many embodiments and modifications of my invention will readily suggest themselves and I desire to be limited only by the prior art and the scope of the appended claims.

What I claim is:

1. The method of refining sulphur which consists in vaporizing the sulphur, subjecting the vapor to mechanical shock to cause condensation of a portion thereof, and then cooling the remainder.

2. The method of refining sulphur which consists in vaporizing the sulphur, projecting the vapor forcibly against a surface to cause condensation of a portion thereof, and then cooling the remainder.

3. The method of refining sulphur which consists in vaporizing the sulphur in a container, injecting jets of gas under pressure into the container to cause the vapor to be projected forcibly against the wall of the container and to condense a portion of the vapor, and conveying the remainder of the vapor to a cooling chamber to be condensed.

4. In a method of separating the allotropic forms of a sulphur vapor, the step consisting in subjecting said substance to mechanical shock.

5. In a method of separating the allotropic forms of a sulphur vapor, the step consisting in projecting said vapor forcibly against a surface.

6. The method of refining sulphur which consists in vaporizing the sulphur, subjecting the vapor to mechanical shock to cause condensation of the $S_6$ molecules, and then cooling the remainder.

7. The method of refining sulphur which consists in vaporizing the sulphur, projecting the vapor against a surface to cause condensation of the $S_6$ molecules, and then cooling the remainder.

8. The method of refining sulphur which consists in vaporizing the sulphur in a container, injecting jets of gas under pressure in the container to cause the vapor to be projected violently against a wall of the container to condense the $S_6$ molecules, and then conveying the remainder of the vapor to a cooling chamber to be condensed.

9. Sulphur produced by sublimation characterized in being substantially free of amorphous sulphur.

10. Sulphur produced by sublimation characterized in being substantially composed of finely divided, crystalline particles only.

11. Sulphur produced by sublimation characterized in being substantially composed of orthorhombic sulphur only.

12. The method of refining sulphur which comprises vaporizing the sulphur, conveying the sulphur vapor through a passage, injecting jets of inert gas into the sulphur vapor in the passage, and diffusing the resulting mixture through a cooling chamber 13. The method of refining sulphur which comprises vaporizing the sulphur, subjecting the vapor to mechanical shock, extracting the condensate thus formed, conveying the remaining vapor through a passage, injecting jets of inert gas into the sulphur vapor in the passage, and diffusing the resulting mixture through a cooling chamber.

In testimony whereof, I have signed my name to this specifiction this 18th day of March, 1926.

EDWARD F. WHITE.